United States Patent [19]
Benjamin

[11] 3,916,948
[45] Nov. 4, 1975

[54] CONTROL VALVE FOR MEDICINAL FLUIDS

[75] Inventor: Thomas A. Benjamin, Deerfield, Ill.

[73] Assignee: Medical Environment Devices, Inc., Wheeling, Ill.

[22] Filed: Dec. 3, 1973

[21] Appl. No.: 420,867

Related U.S. Application Data
[63] Continuation-in-part of Ser. No. 383,161, July 27, 1973, abandoned.

[52] U.S. Cl. ............ 137/608; 137/561; 137/625.48; 137/559; 251/342; 128/274
[51] Int. Cl.² ........................................ F16K 31/00
[58] Field of Search ..... 251/342, 341; 285/DIG. 20; 128/2 A, 2 B, 142, 147, 148, 274, 342, 348, 349; 137/625.48, 608, 561, 559

[56] References Cited
UNITED STATES PATENTS

| | | | |
|---|---|---|---|
| 2,706,134 | 4/1955 | Wilson et al. ................ | 285/DIG. 20 |
| 2,711,740 | 6/1955 | Pickens .......................... | 128/349 R |
| 2,769,442 | 11/1956 | Stubbs ............................ | 251/342 X |
| 2,862,497 | 12/1958 | Pagano .......................... | 251/342 X |
| 2,964,292 | 12/1960 | Noir ................................ | 251/342 |
| 3,599,637 | 8/1971 | Schwartz ........................ | 128/214.4 |
| 3,800,799 | 4/1974 | McWhorter .................... | 251/342 X |

Primary Examiner—Henry T. Klinksiek
Attorney, Agent, or Firm—Kinzer, Plyer, Dorn & McEachran

[57] ABSTRACT

A valve for use in controlling the flow of medicinal fluids includes at least three flexible tubes of equal interior diameter made of a material which is at least partially transparent connected together and forming an inter-communicating central crossover. At least one rigid ball of a diameter greater than the interior diameter of the tubes is positioned therein. The ball is capable of being firmly lodged within any of the tubes and is capable of being switched between tubes by external squeezing forces applied to a tube, forcing the ball out of one tube, through the central crossover, and into another desired tube.

8 Claims, 4 Drawing Figures

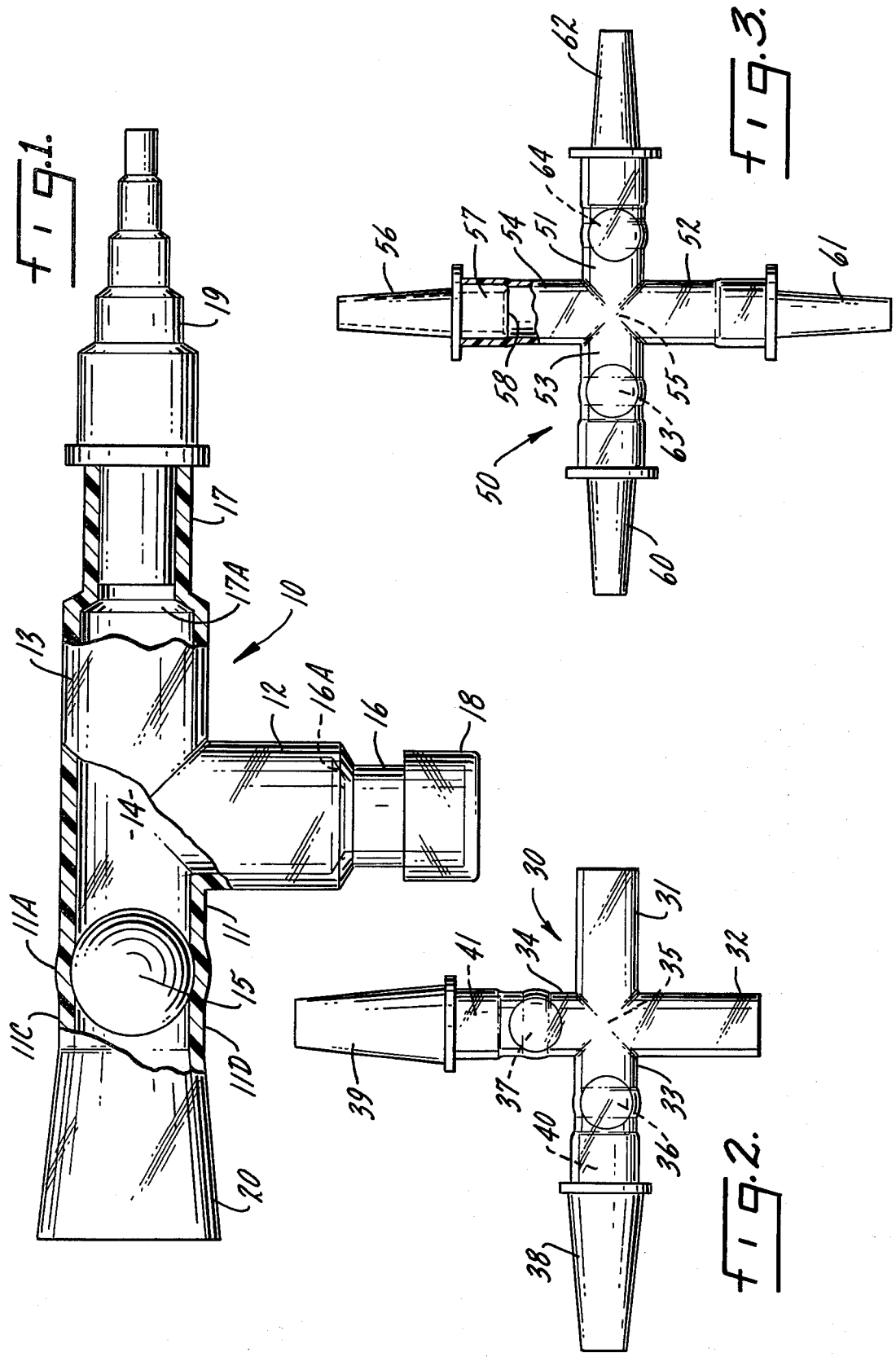

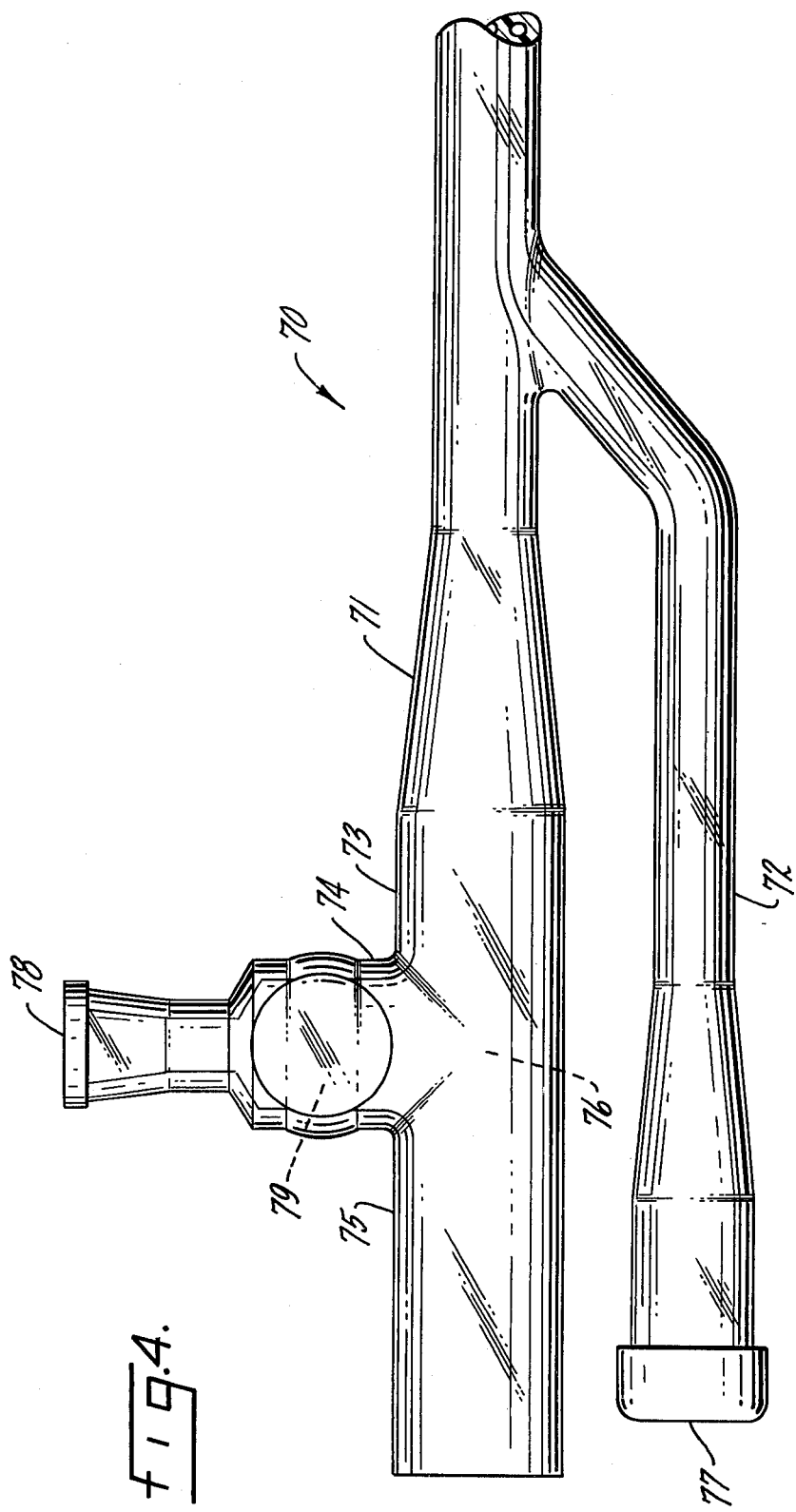

3,916,948

CONTROL VALVE FOR MEDICINAL FLUIDS

BACKGROUND OF THE INVENTION

This is a continuation-in-part of co-pending Ser. No. 383,161 filed July 27, 1973, now abandoned.

At the present time, hospitalized patients whose care includes treatment of the bladder and urinary tract are routinely catheterized by placing a urethral catheter or retention catheter in the urinary tract and bladder, which provides a sterile unobstructed path for the passage of urine. The only end of the catheter is usually connected to a flexible bag or other container by means of a connector and plastic tube. Routinely, the bladder and urinary tract are treated by irrigation with solution or medication. Additionally, "mid-stream" samples of urine are desired for laboratory testing and analysis. Both procedures of irrigating and sampling require either disconnection of the catheter, the use of an expensive catheter with an extra passage for irrigation, or some other modification of the connection or tubing.

All methods require opening the system to the atmosphere, subjecting the patient to possible infection from airborne contamination, and require the attendant performing the procedure to be subjected to a danger of contamination of hands, clothing and bedding with contaminated urine. The potential spread of the contamination is obvious. These same problems are present on those occasions when the drainage container is to be removed from emptying or replacement.

SUMMARY OF THE INVENTION

The present invention relates to a valve for use in controlling the flow of medicinal fluids.

An object of this invention is to provide a device which may be placed between the catheter and the drainage container tube which allows irrigation or sampling without opening the system to the atmosphere.

An allied object is to provide a valve with the flow pattern readily apparent in all valve positions.

A further object is to provide a versatile disposable valve which is suitable for use with medicinal fluids and allows a high degree of switching capabilities.

Other purposes will appear in the ensuing specification, drawings and claims.

BRIEF DESCRIPTION OF THE DRAWINGS

The invention is illustrated diagrammatically in the following drawings wherein:

FIG. 1 is a plan view of a three way valve of the present invention with portions cut away to show interior sections;

FIG. 2 is a plan view of a four way valve of the present invention;

FIG. 3 is a plan view of a four way valve of the present invention with a portion cut away showing an interior section; and, FIG. 4 is a partial plan view of a three way valve of the present invention integrally molded in a catheter.

DETAILED DESCRIPTION OF THE INVENTION

Turning first to FIG. 1, there is shown a three way valve 10 utilizing the principle of the present invention. The valve 10 includes three flexible transparent or translucent tubes 11, 12 and 13 connected together to form an inter-communicating central crossover 14. Each of the tubes 11, 12 and 13 have approximately equal interior diameters. A rigid ball 15 which may be opaque is shown being firmly lodged within tube 11. Since the diameter of the ball 15 is larger than the relaxed internal diameter of the tube 11, the flexible walls of tube 11 bulge at the periphery of ball 15 as shown by 11A providing an elastic force which holds ball 15 in place. The elasticity of the tubes and difference in the diameters of the ball and the inside of the tubes are controlled so that for any given flow pressure through any tube, the tube pressure holding the ball will be great enough so that flow through the tube is completely blocked and the ball does not move. By exerting external squeezing forces approximately at points 11C and 11D, ball 15 can be forced out of tube 11 and into the central crossover 14. Continued squeezing forces can be applied to push the ball into either tube 12 or tube 13, whichever is desired. Tubes 12 and 13 are shown with reduced arms 16 and 17 onto which cap 18 and tubing connector 19 are attached. This reduction in tube size presents seats 16A and 17A which provide an extra sealing surface when ball 15 is pushed against one of the seats. This reduction in size of the arms is not necessary, but is merely convenient for the given connectors; the arm diameters can be increased or decreased as desired for attaching connectors. Connectors may be pressed into the arm or over the arm as desired. The cap and connector have slightly smaller internal diameters than the external diameters of arms 16 or 17 so that the elastic force between the arms 16 or 17 and the cap 18 or the connector 19, hold them firmly in place. Tube 11 is formed with a standard catheter funnel 20 which is readily connected to a tube connector which can be connected to the drainage container.

In operation as a catheter control valve, valve 10 is connected through connector 20 to the drainage bag and tube connector 19 is connected to a catheter. The ball 15 is moved into tube 12 so that urine can flow from the catheter through tube 13, crossover 14, and tube 11 into the collection bag. If a sample of the urine is desired, the cap 18 on tube 12 is removed and a sample bottle is attached to arm 16. The ball is then moved through crossover 14 to tube 11 and the urine will flow through tube 13, crossover 14, and tube 12 into the sample container. Ball 15 is moved back to tube 12 after the desired sample is taken, the sample bottle is removed and the cap 18 is replaced providing a means of taking a sample without opening the system to the atmosphere. Alternately, ball 15 may be placed in tube 11 blocking flow of urine into the drainage bag, causing a small quantity of urine to collect in valve body. A sterile midstream sample can then be obtained by inserting a hypodermic needle attached to a syringe through the body of the valve and withdrawing the sample. The valve body formed by the tubes and the crossover will re-seal at the needle puncture site when the body is made from an appropriate flexible resealable material. For irrigation, an operation similar to that for sample taking is utilized, except that the irrigation source is attached to arm 16 in place of a sample collection bottle.

Turning to FIG. 2, a four-way valve 30 utilizing the principles of the present invention is shown. The valve 30 includes four transparent flexible tubes 31, 32, 33 and 34 with equal interior diameters which are connected together at one of their ends to form an inter communicating central crossover 35. This valve includes two rigid balls 36 and 37 shown firmly lodged in tubes 33 and 34. The diameters of balls 36 and 37 are slightly greater than the interior diameters of the tubes 31, 32, 33 and 34 so that each tube flexes outward providing a gripping force on the ball. A seal is formed between the interior surface of a tube and the circumference of a ball perpendicular to the center axis of the tube which blocks flow of fluid through the tube. Also shown are two tubing connectors 38 and 39 which are pressed inside tubes 33 and 34 which allow tubes 33 and 34 to be connected to external devices. The connectors 38 and 39 have projections 40 and 41 with diameters slightly greater than the inside diameters of the tubes 33 and 34 so as to be held firmly in place by the elastic pressure of the tubes. The two tubes 31 and 32 are capable of receiving other tubing connectors or irrigation syringes. This four-way valve variation could be used for the alternate irrigation and suction of wounds using large volume syringes or other applications requiring the control of a large volume of liquid or gas flow. To vary the flow pattern within the valve the rigid balls 36 and 37 are squeezed into the central crossover 35 and into another desired tube.

FIG. 3 shows a similar four-way valve 50 with four tubes 51, 52, 53 and 54 connected together at one of their ends to form an inter-communicating central crossover 55. A portion of tube 54 is cut away to show the inner portion 57 of connection 56 which has a larger diameter than the inside diameter of tube 54. Also shown is rim 58 on the inside of connector 56 which is capable of providing an extra seat for a ball placed in tube 54. In this embodiment connectors 60, 61 and 62 are also placed in the other tubes of the valve making the tubes suitable for attachment to hypodermic needles or syringes. Any type of connector can be inserted in the tubes to adapt the tubes for connection with any conduit. In this configuration, the valve becomes a satisfactory substitute three-way or four-way stop cock which is normally used in exchange transfusions, spinal taps, and mylograms. The rigid ball 63 and 64 can be manipulated from one tube to another to control the direction of flow between the syringes, needles, connectors and manometers as desired.

FIG. 4 shows a catheter 70 with a three-way valve constructed in accordance with an embodiment of the invention integrally molded into the drainage outlet 71. The omitted portion of the catheter is of standard construction as is the inflation tube 72. Note that outlet 71 exists into three flexible tubes 73, 74 and 75 of equal interior diameter all connected at one end to an inter-communicating central crossover 76. The three tubes, 73, 74 and 75 and the entire catheter 71, 72 and omitted portion are conveniently cast as a one piece molding of a translucent plastic material such as rubber. Stoppers 77 and 78 are inserted into the inflation tube and tube 74, and rigid ball 79 is inserted through tube 75. Ball 79 is preferably a dark opaque color which readily shows through the translucent plastic. As before, ball 79 can be squeezed from any of tubes 73, 74 and 75 through central crossover 76 and into any of the other tubes. When ball 79 is in tube 75, the catheter is in its irrigation, sterile sample and bag changing position; and, when ball 79 is in tube 73, the catheter is in its bladder medicating (retain medication) or bladder "tone" building position.

One of the important features of the present invention is the at least partially transparent nature of the housing valve. Thus, the tubes and crossover may be translucent to allow viewing of interior materials. The ball may be opaque or so formed as to be easily visible for observation of the exact setting and flow patterns of the valve. This is of tremendous importance in controlling medicinal fluids since the wrong adjustment of a valve may cause loss of life. In valves with the internal components not visible to the user, there is always the danger of forgetting where the value is set. External markings are often worn off or dissolved in fluids so are not a guarantee of accuracy. In a preferred embodiment, the ball or balls are opaque; however, with a visible fluid like blood, transparent balls could be used.

It should be apparent that the principle of the invention is not limited to tubes at 90° angles. A three tube valve could be Y-shaped or with any desired angle. Accordingly, a six tubed valve could have 60° angles between all the tubes, or 40° between three and 80° between the other three, or whatever is desired. Moreover, all the tubes do not have to be in the same plane; for example a four tube valve could contain three tubes in a T-configuration in one plane and a fourth tube extend out of the plane at any desired angle, or two tubes in one plane and two tubes in another plane. Thus the number of tubes, and the planes and angles between the tubes is easily varied as desired to suit a user's needs.

Moreover, the feature of switching flow from one tube to another without opening the system to the atmosphere is extremely advantageous in medical operations. Any tube of the valve can be closed off by a ball and the connecting means or adapters changed to allow the substitution of other external devices desired while the remaining flow pattern of the system remains undisturbed. As is apparent, more tubes than four can be used and the number of rigid balls can correspondingly be increased. Generally the number of rigid balls will be two less than the number of flexible tubes so that one flow pattern providiing flow into the central crossover and out from the central crossover can be achieved. However in some uses fewer balls may be desired so that at least three tubes are always open, or two balls may be placed in one tube to allow at least three tubes to be open.

This device then provides hospital personnel with a simple, easily-operated, inexpensive device which provides increased patient protection by eliminating the need to break the connection between catheter and tube, and permits the personnel to perform these various procedures with greatly reduced possibility of contamination of person, clothing, and bedding, thereby reducing chances of infection and cross-contamination.

The valves of the present invention can easily be molded from rubber or plastic and are quite inexpensive. Thus, they are capable of disposable use which is especially useful in sterile medical operations and they provide a degree of freedom in operation functions heretofore unavailable in disposable devices.

Whereas the preferred form of the invention has been shown and described herein, it should be realized that there may by many modifications, substitutions and alterations thereto.

I claim:

1. A valve for use in controlling the flow of medicinal fluids including:
   at least three flexible tubes of equal interior diameter made of a material which is at least partially transparent, said tubes being connected together at one of their ends and forming an inter-communicating central crossover;

at least one rigid ball formed of a material readily visible through said at least partially transparent tubes, said ball having a continuous outer spherical surface and a diameter greater than the interior diameter of said tubes wherein the rigid ball is capable of being firmly lodged within any of said tubes and is capable of bein switched between any of said tubes by external squeezing forces being applied to the tube, forcing the ball out of one tube, through said central crossover, and into another desired tube, a ball positioned in any one tube permitting communication between other tubes, with movement of the ball between different tubes changing the pattern of inter-tube flow.

2. A valve as in claim 1 wherein the number of rigid balls is two less than the number of flexible tubes.

3. A valve as in claim 1 wherein there are three flexible tubes and one rigid ball.

4. A valve as in claim 1 where there are four flexible tubes and two rigid balls.

5. A valve as in claim 1 wherein said rigid ball is opaque.

6. A valve as in claim 1 wherein the ends of said tubes opposite the connection of said inter-communicating central crossover are capable of receiving connectors which are adapted to receive other conduits.

7. A valve as in claim 1 wherein said tubes and said crossover are molded from a flexible plastic.

8. A flow control device as in claim 1 wherein said flexible, at least partially transparent material is additionally self-sealing whenever punctured by a needle.

* * * * *